(12) United States Patent
Yang et al.

(10) Patent No.: US 12,288,183 B2
(45) Date of Patent: Apr. 29, 2025

(54) PROCESSING ROUTE INFORMATION

(71) Applicant: GRABTAXI HOLDINGS PTE. LTD., Singapore (SG)

(72) Inventors: Liuqin Yang, Singapore (SG); Renrong Weng, Singapore (SG); Sizhe Zhang, Singapore (SG)

(73) Assignee: GRABTAXI HOLDINGS PTE. LTD., Singapore (SG)

( * ) Notice: Subject to any disclaimer, the term of this patent is extended or adjusted under 35 U.S.C. 154(b) by 0 days.

(21) Appl. No.: 17/620,536

(22) PCT Filed: Jun. 27, 2019

(86) PCT No.: PCT/SG2019/050319
§ 371 (c)(1),
(2) Date: Dec. 17, 2021

(87) PCT Pub. No.: WO2020/263176
PCT Pub. Date: Dec. 30, 2020

(65) Prior Publication Data
US 2022/0327483 A1 Oct. 13, 2022

(51) Int. Cl.
*G06Q 10/08* (2024.01)
*G06Q 10/0835* (2023.01)

(52) U.S. Cl.
CPC .............................. *G06Q 10/08355* (2013.01)

(58) Field of Classification Search
CPC ............................................... G06Q 10/08355
(Continued)

(56) References Cited

U.S. PATENT DOCUMENTS 11,308,536 B1 * 4/2022 Adler ................. G06Q 30/0629
2012/0173136 A1 7/2012 Ghoting et al.
(Continued)

FOREIGN PATENT DOCUMENTS

CN 104575072 4/2015
CN 104952248 9/2015
(Continued)

OTHER PUBLICATIONS

Jindal et al., Optimizing Taxi Carpool Policies via Reinforcement Learning and Spatio-Temporal Mining, Nov. 2018, IEEE International Conference on Big Data, pp. 1417-1426 (Year: 2018).*
(Continued)

*Primary Examiner* — Daniel Vetter
*Assistant Examiner* — Christopher Gomez
(74) *Attorney, Agent, or Firm* — Buckley, Maschoff & Talwalkar LLC

(57) ABSTRACT

Server apparatus comprising a processor and a memory, the server apparatus being configured, under control of the processor, to execute instructions stored in the memory: to establish a route data record comprising data indicative of plural routes, each said route being between a start location and a respective destination, whereby each respective destination has at least one route to it from said start location; to process the route data record to determine a zone data record indicative of zones making up each route; and to combine the zone data record with a prediction data record to score the route data making up each said route to each destination based upon a prediction of the probability of a job or expected revenue in each zone making up that route.

22 Claims, 7 Drawing Sheets
(3 of 7 Drawing Sheet(s) Filed in Color)

(58) Field of Classification Search
USPC .......................................................... 705/338
See application file for complete search history.

(56) References Cited

U.S. PATENT DOCUMENTS

| | | |
|---|---|---|
| 2013/0144831 A1 | 6/2013 | Atlas |
| 2014/0163872 A1* | 6/2014 | Schilling .............. G01C 21/387 |
| | | 701/527 |
| 2015/0002319 A1 | 1/2015 | Jin et al. |
| 2015/0134244 A1* | 5/2015 | Hershey ............. G01C 21/3617 |
| | | 701/489 |
| 2015/0199697 A1 | 7/2015 | Handley |
| 2015/0227890 A1* | 8/2015 | Bednarek ........... G06Q 10/0833 |
| | | 705/26.81 |
| 2016/0091331 A1* | 3/2016 | Schilling .............. G01C 21/387 |
| | | 701/533 |
| 2016/0129787 A1 | 5/2016 | Netzer |
| 2017/0227370 A1 | 8/2017 | O'Mahony et al. |
| 2017/0359197 A1* | 12/2017 | Stolfus ............. G08G 1/096816 |
| 2017/0363435 A1* | 12/2017 | O'Mahony ............ G06Q 10/00 |
| 2018/0018572 A1 | 1/2018 | Wang et al. |
| 2018/0188049 A1 | 7/2018 | Shi et al. |
| 2018/0188068 A1 | 7/2018 | Droege et al. |
| 2018/0189717 A1* | 7/2018 | Cao ........................ G06Q 50/30 |
| 2019/0107404 A1* | 4/2019 | Zhong ................ G06Q 30/0284 |
| 2022/0198352 A1* | 6/2022 | Benkert ................. G08G 1/202 |

FOREIGN PATENT DOCUMENTS

| | | |
|---|---|---|
| CN | 106980907 | 7/2017 |
| CN | 107103383 | 8/2017 |
| CN | 107832882 | 3/2018 |
| CN | 108022006 | 5/2018 |
| CN | 108062857 | 5/2018 |
| CN | 108846524 | 11/2018 |
| EP | 1551195 | 7/2005 |
| JP | 2012-43296 | 3/2012 |

OTHER PUBLICATIONS

European Search Report for Application No. 19 934 837.6, mailed Jan. 2, 2023 (9 pages).
International Search Report for Application No. PCT/SG2019/050319, mailed Oct. 7, 2019. 3 pagers.
Japanese Office Action for App. No. 2021-576481, mailed Mar. 7, 2023 (6 pages).
"Malaysia Search Report" dated Nov. 30, 2023, Intellectual Property Corporation of Malaysia, for Malaysia Application No. PI2021007469, 4pgs.

* cited by examiner

| C 13 | C 14 | C 15 | C 16 |
|------|------|------|------|
| C 9  | C 10 | C 11 | C 12 |
| C 5  | C 6  | C 7  | C 8  |
| C 1  | C 2  | C 3  | Cl 4 |

| destination | geohash | duration (second) | job probability in 15min | expected revenue in 15min | color in map |
|---|---|---|---|---|---|
| 1 | a | 236 | 0.967949728 | 16.59296601 | red |
| 2 | b | 244 | 0.974618189 | 16.51342844 | blue |
| 3 | c | 463 | 0.994606503 | 15.07528999 | black |
| 4 | d | 8 | 0.87722685 | 13.67456303 | orange |
| 5 | e | 648 | 0.997315621 | 13.19973647 | brown |
| 6 | f | 511 | 0.991485488 | 13.16399544 | gray |
| 7 | g | 275 | 0.957987686 | 12.25283 | green |
| 8 | h | 275 | 0.943054542 | 12.23853793 | purple |
| 9 | i | 309 | 0.866338744 | 11.18370051 | cyan |

FIGURE 5

PROCESSING ROUTE INFORMATION

TECHNICAL FIELD

The invention is in the general fields of communications and management. One aspect has a context of on-demand service providers, such as taxi-type services, bikes, delivery vehicles. These service providers are essentially mobile.

BACKGROUND

Moving people and goods around more effectively is becoming an increasingly significant aim. Recently there has been a growth in on-demand service provision, by means of which both goods and people can move or be moved with less delays than with previous technology. An on-demand service provider may be a human driving a vehicle or alternatively could be a driverless vehicle. Where a user has required the service provider to move to a destination location, it is highly possible that a fresh "job" from that destination location, or from nearby that location, will not be immediately available.

At this point the concept of "surge" is explained. Surge can occur where or when a shortfall of service providers arises, or looked at in reverse, an over-abundance of service users arises. Surge is where pricing is varied so that the cost of a job increases, usually by a set multiplication factor. Hence, as an example a job that would normally cost $5 might be increased to $8. Pricing information is made available to prospective users, so that those prospective users whose need for service is urgent can pay the surge charge, while others may choose simply not take their request further, due to high price, or to wait for the surge situation to clear and costs to revert to normal.

Other Terms Used Herein

Machine learning: Within the field of data analytics, machine learning is a method used to devise complex models and algorithms that lend themselves to prediction; in commercial use, this is known as predictive analytics. These analytical models allow researchers, data scientists, engineers, and analysts to "produce reliable, repeatable decisions and results" and uncover "hidden insights" through learning from historical relationships and trends in the data.

Survival analysis: survival analysis is a branch of statistics for analysing the expected duration of time until one or more events happen, such as death in biological organisms and failure in mechanical systems.

Optimisation: optimisation is the selection of a best element (with regard to some criterion) from some set of available alternatives.

US2017/0227370A discloses a travel coordination system provides information to providers to reduce the wait time between trips. A region is partitioned into zones and generates a score for each zone. A zone score can be generated by estimating the wait time for the zone, which may be determined by a model for the wait time. The model for the wait time may use factors that contribute to the wait time, such as the number of providers in a zone and the trip request rate. The zone score for each zone is displayed to the provider on a road map of the geographic region. The travel coordination system also provides routes that use zone scoring to reduce the wait time for receiving an assignment request during travel to the destination. The travel coordination system identifies a destination and generates candidate routes to the destination. A route is selected based on route scores.

SUMMARY

In one aspect there is disclosed a technique for directing a mobile service provider comprising selecting a destination out of plural destinations according to predictions that the service provider will find a job.

The technique may include processing route information to determine a job prediction for each of plural candidate destinations.

In a second aspect there is disclosed a technique for directing a service provider towards a selected destination by means of a selected route, wherein the destination and route are selected according to predictions that a job done as a result of following that route will have a high revenue.

In a third aspect there is provided a method of processing route information for a mobile service provider in which plural candidate destinations are considered, routes and destinations being determined by scoring each route according to the predicted probability of finding a job along each route to each of the plural destinations.

In a fourth aspect there is provided a method of processing route information for a service provider, the method comprising predicting the probability of finding a job along routes from a start location, ie the current location of a service provider, to different destinations and using this probability to score each route depending on a prediction of the revenue from a job along each route.

One embodiment divides each route to each potential destination into plural segments, and uses survival analysis (i.e. predicting the duration before an on-demand target location is attained) to determine the likelihood of attaining a job either during the passage along the route or upon reaching the destination. In embodiments, predictions take into account the length of time a provider is expected to spend in respective segments of the route under consideration, and also the time of entry into successive segments.

An embodiment uses historical and real time data to predict conditions in an area around each segment. The predictions may be repeated for all routes and destinations, and a target provider is messaged with the route and destination having the highest predicted results.

In a fifth aspect there is disclosed server apparatus comprising a processor and a memory, the server apparatus being configured, under control of the processor, to execute instructions stored in the memory: to generate a route data record comprising data indicative of plural routes, each said route being between a start location and a respective destination, whereby each respective destination has at least one route to it from said start location; to process the route data record to determine a zone data record indicative of zones making up each route; and to combine the zone data record with a prediction data record to score the route data making up each said route to each destination based upon a prediction of the probability of a job in each zone making up that route.

In another aspect there is a method of processing route information for potential movements of a service provider in a geographical area made up of a plurality of zones, the method comprising selecting plural zones of said plurality as target zones, for each target zone determining a respective route from a current service provider communication device location to a respective point of interest in the respective target zone; for each route, identifying the trajectory segment travelled between the current location and the respective point of interest in the respective target zone; and scoring each route to each target zone based upon a prediction of the likelihood of a job in each said trajectory segment.

In a further aspect there is a method of processing route information for a service provider located within a geographical area made up of a plurality of zones, each zone having a respective destination; the method comprising establishing plural routes, each of said routes being between a current service provider communication device location and a respective destination, whereby each respective destination has at least one route to it from said current service provider communication device location; determining trajectory segment making up each route; and scoring each said route to each destination based upon a prediction of the likelihood of a job in each trajectory segment making up that route.

In a still further aspect there is a provided method of route information for a service provider within a geographical area made up of a plurality of zones, each zone having a respective destination; the method comprising the steps of:—establishing plural routes, each said route being between a start location and a respective destination, whereby each respective destination has at least one route to it from said start location; determining trajectory segment making up each route; and scoring each said route to each destination based upon a prediction of the revenue to be derived from a job in each trajectory segment making up that route.

In yet a further aspect there is provided a computer system configured to run a machine learning algorithm, the algorithm being configured to access a store to read data stored therein, and to adapt predictions of parameter values according to the stored data that has been read.

The stored data may be held in a data warehouse.

In an embodiment, the machine learning algorithms access the data warehouse to determine identities of service providers by cell, and to use information from the data warehouse in predicting supply, demand and surge in each cell.

Current data may be taken into account along with stored data so that the algorithm has the effect of updating data to be used in forming subsequent predictions.

In a family of embodiments, when a service provider indicates the service provider has become idle or is about to become idle, a server assesses locations and routes to locations where a service may be requested and/or the likely revenue to be gained by following that route, using the outcome of the machine learning processes.

In embodiments, the outcome comprises the probability to find a job or expected revenue gained for each route to each location.

The machine learning algorithm in some embodiments learns the locations of cells that service providers are unwilling or are predicted as unwilling to drive to from the idle provider vehicle location.

In an embodiment multiple survival models are used to predict the job probability and/or revenue based on supply, demand and surge in each cell or sub-area.

In some embodiments, without loss of generality, each zone is a respective geohash. In other embodiments other types of zone are envisaged, for example non-rectangular zones such as hexagons.

Some other features of embodiments are recited in dependent claims later herein.

An advantage of embodiments lies in improving the way available data is processed and delivered to each of plural on-line providers in order to improve the likelihood of a maximized job/occupancy/revenue outcome.

BRIEF DESCRIPTION OF THE DRAWINGS

This patent or application file contains at least one drawing executed in color.

FIG. 5 shows a table illustrating computing job probability and expected revenue of all the 1st layer neighbour geohashes of a first geohash';

DETAILED DESCRIPTION

Figure 1:
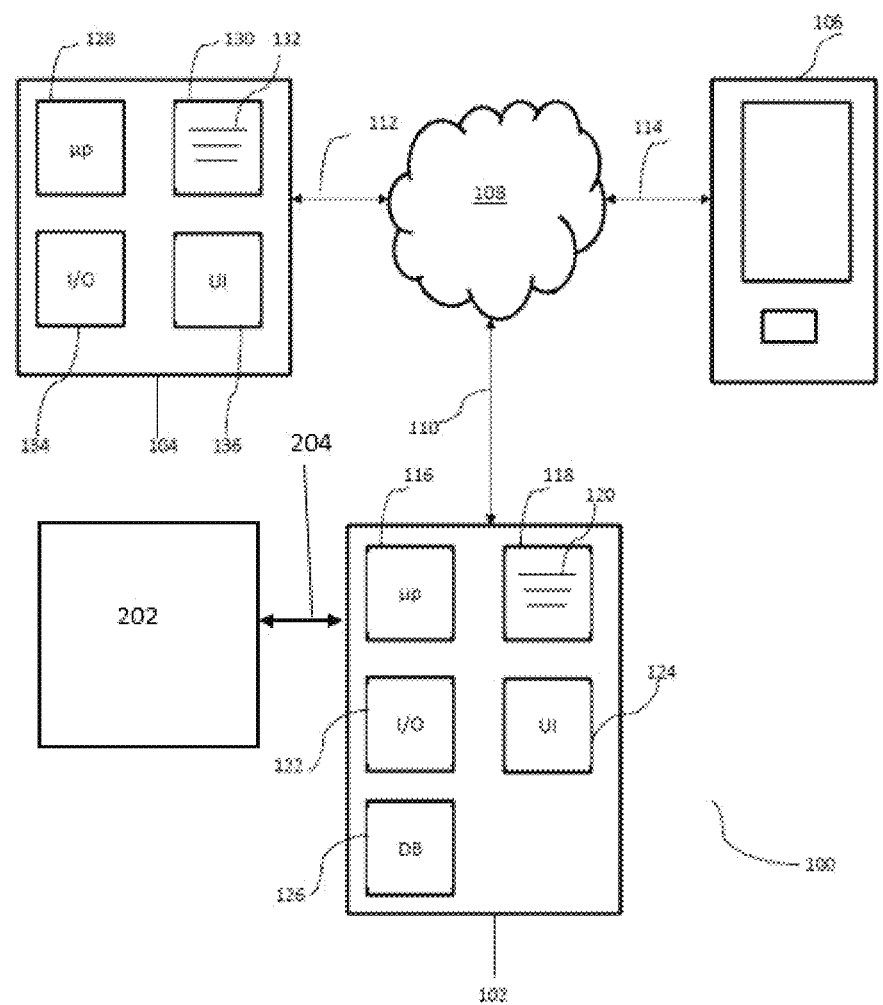
FIG. 1 shows a schematic drawing of a communication system.

Referring first to FIG. 1, a system 100 for directing a service provider is illustrated. System 100 comprises server apparatus 102, service provider communications device 104, user communications device 106 and a data store which in this embodiment is a data warehouse 202. These devices are connected in a communications network 108 (for example the Internet) through respective communications links 110, 112, 114, 204 implementing, for example, internet communications protocols. Communications devices 104, 106 may be able to communicate through other communications networks, such as public switched telephone networks (PSTN networks), including mobile cellular communications networks, but these are omitted from FIG. 1 for the sake of clarity.

Server apparatus 102 may be a single server as illustrated schematically in FIG. 1, or have the functionality performed by the server apparatus 102 distributed across multiple server components. In the example of FIG. 1, server apparatus 102 may comprise a number of individual components including, but not limited to, one or more microprocessors 116, a memory 118 (e.g. a volatile memory such as a RAM) for the loading of executable instructions 120, the executable instructions defining the functionality of the server apparatus 102 carries out under control of the processor 116. Server apparatus 102 also comprises an input/output module 122 allowing the server to communicate over the communications network 108. User interface 124 is provided for user control and may comprise, for example, conventional computing peripheral devices such as display monitors, computer keyboards and the like.

Service provider communications device 104 may comprise a number of individual components including, but not limited to, one or more microprocessors 128, a memory 130 (e.g. a volatile memory such as a RAM) for the loading of executable instructions 132, the executable instructions defining the functionality the service provider communications device 104 carries out under control of the processor 128. Service provider communications device 104 also comprises an input/output module 134 allowing the service provider communications device 104 to communicate data records over the communications network 108. A data record, for example, a file, comprises one or more fields, the fields comprising data representative of the respective parameters discussed herein. A route data record, as described in further detail below, comprises, for instance, data fields representing one or more routes. A start location may be represented by data in a "start location" data field, a destination location may be represented by data in a "destination location" data field and so on. Where tables are illustrated in the drawings and described below, a data field may comprise data representative of a value illustrated in a cell of the table, and multiple data fields—for example, an entire row or a group of rows—can be used to form a data record.

User interface 136 is provided for user control. If the service provider communications device 104 is, say, a smart phone or tablet device, the user interface 136 will have a touch panel display as is prevalent in many smart phone and other handheld devices.

Alternatively, if the service provider communications device is, say, a conventional desktop or laptop computer, the user interface may have, for example, conventional computing peripheral devices such as display monitors, computer keyboards and the like.

User communications device 106 may be, for example, a smart phone or tablet device with the same or a similar hardware architecture to that of service provider communications device 104.

In this embodiment, data warehouse 202 is connected directly via communications link 204 to server apparatus 102 but this is not essential. Connection via communication network 108 is also possible.

In one embodiment, the service provider communication devices 104 are configured to regularly push data records representative of the service provider state to the server apparatus 102. In others, the server apparatus 102 polls the service provider communications devices for state information. Such information may include data fields/records comprising data representative of the location of the service provider communications device 104, whether the service provider is currently active, if so, how long before the provider becomes inactive and so on. In either case the data records from the service provider communication devices 104 are communicated to the server apparatus 102 and stored in relevant locations in the data warehouse 202. Historical data in the data warehouse 202 may be used for predicting future conditions such as the probable number of users requesting service in a given forthcoming period and in any given area, the probable number of service providers available in that time period, and their likely geographical distribution.

In use of this embodiment a user interacts with user communication device 106 to input a data record requesting service. This data record is passed to server 102, which extracts data from the received data records and stores this data in the data warehouse 202. In an embodiment, such data includes the identity of the specific user communication device 106, the location of that device, the time the service was requested, the destination for the service amongst other things. In an embodiment, the server apparatus 102 passes a data record comprising certain user data onto specific service provider communication devices 104, for example the nature of the job, the location and the destination may be passed on to all service provider devices 104. In an embodiment such data is passed only to service providers meeting certain criteria, according to data stored in the data warehouse 202. The criteria in one embodiment include as the location of the service provider communications device, whether the service provider having that device is occupied or free.

In an embodiment, a matching process is carried out by the server so that the user gets the service requested from a service provider. This is logged by the system and the data is stored in the data warehouse 202, along with time and date information. At some point one or more service providers is likely to become idle, where idle means ready and willing to accept a service request. This fact, too, is logged in an embodiment into the data warehouse 202, along with the date and time and location of the now-idle service provider.

Figures 2, 3:
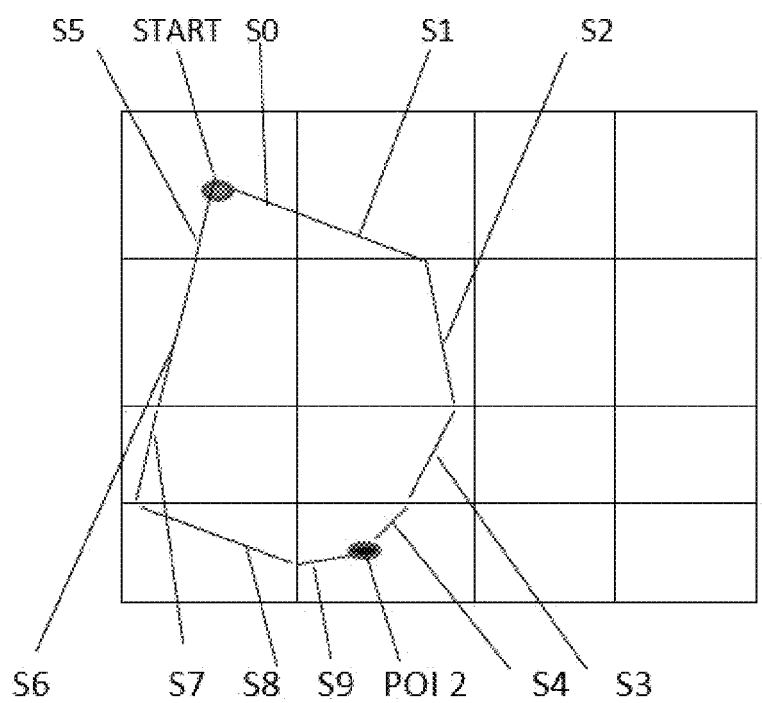
FIG. 2 shows a schematic representation of a geographic region.
FIG. 3 shows the geographic region of FIG. 2 with an idle service provider and a potential target destination.

Referring to FIG. 2, a schematic representation of a geographic region consists of 16 zones arranged in a 4×4 matrix. This size of matrix is chosen for simplicity of explanation—a real geographical region is likely to have many more zones. Hereinafter the zones are mainly referred to as "cells" without any intended limitation of scope. Each cell contains a respective location, referred to herein as a point of interest (POI). In one embodiment, each point of interest is a single location in a respective cell that is chosen at the time of set up of the route selecting system. The cells in this figure are shown numbered for convenience from 1 to 16, and in cell C13 is a service provider vehicle V (the indication of vehicle V omitted from the Figure for clarity).

In another embodiment there are many POIs in each cell. A specific POI for each cell is selected for a specific service provider based on different conditions: the distance and time for the service provider to go there; the predicted demand near and/or at the POI; how many service providers near and/or at the POI now; how many service providers have been suggested going to the POI by this model, which avoids that too many service providers are sent to the same POI; whether the service provider can stay at or near the POI.

In an embodiment, the server 102 runs machine learning processes which access data records/fields in the data warehouse 202 to access identities of service providers by cell, and to use information from the data warehouse 202 to predict supply, demand and surge in each cell. When a service provider indicates that the service provider has become idle or is about to become idle, in embodiments, the server assesses locations and routes to locations where a service may be requested and/or the likely revenue to be gained by following that route, using the outcome of the machine learning processes. The outcome in embodiments, includes an estimate of the starting time of each route in each cell and the duration of time spent in each cell. The machine learning algorithm in some embodiments learns the locations of cells that service providers are unwilling to drive to, or are predicted as unwilling to drive to, from the idle provider vehicle location.

In a non-limiting example of a machine learning process, the server takes some or all of the following steps:

i) Predict supply, demand and surge for each of plural geographical areas. For example for a set of areas or zones making up a city, the time period over which forecasting takes place can be varied, either as a standing time period, say 15 minutes for one city and 30 minutes for another city (depending on the traffic conditions or other parameters specific to the city) or a variable/selectable time period. By a "variable time period" is meant a time period that can be varied without any constraint. By "selectable time period" is meant that there is a population of time period values which are available for selection, so for example a 15 minute period might be selected during the middle of the day, but a 10 minute period for the rush hour, and a 30 minute period for the middle of the night. Periods may be time dependent, or may be adaptable, so that if demand is unusually low the system varies the period accordingly. Forecasting algorithms may comprise Time-series models, such as Double Seasonal Holt-Winters (DSHW), AutoRegressive Integrated Moving Average (ARIMA) etc, or ML models, such as Recurrent Neural Networks (RNN), Long Short-Term Memory (LSTM).

ii) For each idle service provider, find candidate POIs and top K driving routes to the candidate POIs.

iii) Divide the K routes into trajectory segments, it is allowable to share one or more trajectory segment by plural routes.

iv) For each trajectory segment, predict the starting time of the said trajectory segment and the duration of time spent in the said trajectory segment, using routing distance, real time traffic information, travelling speed etc.

v) Using survival analysis techniques, such as Cox's hazard model and Aalen's additive hazard model, determine the likelihood of attaining a job in each trajectory segment based on the predicted starting time and duration of time spent in the respective segment, predicted supply and demand and rating of the service provider, priority of the service provider, latitude, longitude, day of week, hour of day, public holiday or not etc.

vi) For each trajectory segment, predict the expected revenue of each trajectory based on predicted probability to secure a job, average fare per trip from historical data, average petrol cost per km, average driver income per minute, routing distance and predicted duration of time spend and forecasted surge.

vii) Update the data used in forming predictions using actual results, for example based upon a route or trajectory segment actually used.

In an embodiment the server 102 uses multiple survival models to predict the job probability and/or revenue based on supply, demand and surge in each sub-area.

As illustrated in FIG. 2, all the cells of the presently described embodiment are of the same size and shape but this is only for ease of explanation and understanding. It is not fundamental to the concept. In some embodiments the cells are of a single fixed size. In other embodiments calls are adjusted based on time and location, e.g., smaller cells in the city centre, and larger cells in the surrounding country. Equally where traffic conditions vary substantially with time, cell sizes in some embodiments are changed to cope— so for example, a CBD may lack traffic at the weekend, so a larger cell may be used than the relatively small cells used in weekday rush hours. One of the advantages is that there is no need to calculate the metrics for a lot of similar cells having only small supply and demand and this saves the computation of the final score.

Where the system is directed to human service providers the POI is, in one embodiment, chosen to be somewhere known to service providers or evident to service providers. It need not be a location of social or other significance, and could, for example, simply be a car park. As noted above, a service provider vehicle V, currently idle, is located in the top left cell of the region (C13). In this simplified embodiment this considers only one such idle service provider vehicle, whereas in an embodiment there may be a considerable number of idle service provider vehicles, perhaps, although not necessarily, in different cells. In some embodiments, provider vehicles that are predicted as shortly to become idle are considered as well, and are included in the term "idle service provider vehicle". In some embodiments, a human driver or rider operating as a service provider has the ability to request the operation described herein, for example using a dedicated button or by interacting with a GUI on the service provider communication device.

A prediction step is carried out to predict the demand, the service provider supply and the surge, i.e., the multiplier of calculating the final fare from the base fare, at all the cells, for a specific time period. The time period is typically the forthcoming period with a duration generally corresponding to the length of time a service provider vehicle would take to reach the furthest zone. The prediction step, in the present embodiment, is implemented for each idle service provider vehicle only at the time the vehicle becomes idle or requests the operation described herein.

In another embodiment the prediction step is carried out continuously or substantially continuously. Prediction taking place continuously may include supply, demand, and surge. Note that the prediction is not only for this model, and it can be used in the whole system. For the suggestions of the POI, in one embodiment the candidate routes score is carried out ONLY in response to a service provider becoming idle or the service provider presses the button to request this support. The results for the same service provider in one embodiment are cached for a time window, e.g., 5 mins, i.e., if the same service provider requests this in the same time window the same result will be given without updating the computation.

In a family of embodiments, a decision is made over which cells are candidate destination cells, where "candidate destination cells" means cells sufficiently close to the location of the idle service provider. In one member of the family of embodiments, the decision is made using a machine learning algorithm to determine cells that service providers are or are predicted as unwilling to drive to from the idle provider vehicle location. In another embodiment, the decision is arrived at empirically, so for example driving through 4 cells is deemed the limit.

In the next step, any zone that is too remote is ruled out of consideration. In the present example, the zone C4 is excluded as being too far from C13.

In another embodiment all cells are taken into account, that is, no cell is excluded on the basis of too long to reach or too far away.

Referring to FIG. 3, the location "START" in cell C13 is the point where the service provider became idle.

The next step is to identify up to a set number of routes from the start location to each point of interest. This may be performed by using a proprietary route-finding application, or may be performed by any other route-finding application.

For the sake of simplicity, a single point of interest POI 2 is being considered in FIGS. 2 and 3. It will be appreciated that this is for explanation only. In a practical example all non-excluded destinations are considered during attention to each candidate service provider vehicle.

As shown in FIG. 3, POI 2 is located in cell C2. Two routes are identified from START to POI 2. The number of routes can be determined depending upon the circumstances and the nature of the location. If a large number of alternative routes are possible, the set number may need to be restricted. In this embodiment, the two routes are the two alternatives provided by a proprietary route finder.

The system determines which cells each route travels in, and in some embodiments predicts the length of time spent in each cell whilst travelling on each route.

It is noted that the first route consists of segment S0 (the starting segment in cell C13), S1, S2, S3 and S4 (the final segment in cell C2). The second route consists of segments S5, S6, S7, S8 and S9. In an embodiment, a "segment" is a portion of the route across a particular cell, although it will also be appreciated that segments can be defined in alternative ways.

For instance, a route across a particular cell may comprise more than one segment, with the segments meeting at an intermediate point in that cell.

This means that the first route travels in C13, C14, C10, C6 and C2 and the second route travels in C13, C9, C5, C1 and C2.

If the dimensions of FIG. 3 were accurate, then the length of the route segment S6 traversing cell C9 is greater than the length of route segment S1 traversing cell C14. It may be that the time spent in C9 is greater than that in C14, but this need not be true if segment S6 is a fast expressway whereas S1 is a slow journey through heavy traffic in town.

Although the segments S0 and S5 lie in the same cell C13, in the present embodiment the "score" of the two segments need not be the same. In fact, it is unlikely they will be the same. This is because the length of time taken by a driver in cell C13 if he drives on segment S0 is likely to be different to the length of time that driver would spend in cell C13 if he were to drive on segment S5.

For that reason, the present embodiment involves predicting the duration of time spent in each cell, for example using machine learning algorithms, based on time of day, day of week, historical road travelling speed, real time traffic condition, weather etc.

Equally a driver driving on route 2 will likely enter segment S9 (cell C2) at a different time to the arrival time of the driver if he were on route 1 (entering C2 at S4). Then the length of time spent on segment S9 is also likely to differ from the length of time on segment S4.

The present embodiment takes these factors into account, for example by machine learning algorithms.

In the present embodiment, determination of routes with regard to distance and time in cells is performed each time a route is established, that is each time a service provider falls idle. In other embodiments, the parameters of each route may be stored after it has been first established. In the latter case, if a subsequent service provider becomes idle at C13, the two routes to C2 are simply retrieved from memory. It would also be possible to create routes in segmented form during a system setup process.

In some embodiments, it is only necessary to identify cell boundaries, since when a route reaches such a boundary that is the end of one segment and the start of the next.

In some embodiments, the routes are provided by either a proprietary route-finding application or from a route-finding provider, such as for example Google maps. In this case a list of intermediate points can be found along the route. Even though a continuous path may not be available, the points along the route can be identified as to which cell they are in, and that is sufficient for this system. If a cell is defined by a geohash, then the route-finding provider or other APIs can return which geohash that each point belongs to.

Figure 7:
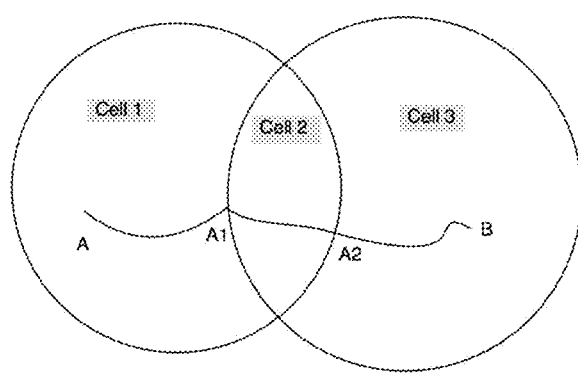
FIG. 7 shows an illustrative example of determining cells in which a vehicle will travel to complete a route.

Alternatively, turning to FIG. 7, if a starting point A is in cell 1, the server apparatus goes through the intermediate points until a point on the route is found to lie in a new cell (e.g. point A1). This process of listing cells through which the route passes continues until the endpoint cell, cell B.

If on the other hand the system itself defines the cells, then it is known if a point belongs to a cell or not. Then the above process can be used, treating a cell like a "geohash".

For each route, the system scores each cell for the estimated revenue and probability that the service provider will get a job in the cell in which the respective route segment is located. The scoring of likelihood of a job in each cell is based at least in part on predicted supply, demand, and the duration of the route segment predicted to be spent in the cell of concern.

Then the system calculates the probability of a job for the whole route, including the first and last cells, and the expected revenue of this route by using the computed values of the route segments. The routes are ranked and the route with the prediction of the best probability or the highest predicted revenue is selected.

With such a simple set-up as FIG. 3, the ranking would be a comparison between the probability of securing a job by staying in C13 using the predicted supply, demand and surge for C13 compared to the predictions for each of the two routes to POI 2.

In a another arrangement, there will be plural destination cells under consideration, each with one or plural routes to it from a starting location where an idle service provider is located.

Where the service provider is a human driver, the next step is to send a message to the communications device of the driver of concern to advise him/her (and in this embodiment only him/her) of the recommended destination POI and the preferred route to that POI. Where an autonomous vehicle is used, the message instead, in an embodiment, directly controls the destination and route of the vehicle.

For the sake of clarity, it should be noted that each cell is included in each set of segments making up a route. It should also be noted that, as noted above, one route can be to a location starting within the starting cell. If, for example, a user ends their route at a train station in the starting cell and the present system predicts that a high probability of a job is to be found at a shopping mall also in the starting cell, the service provider may simply receive a message to remain in the starting cell to await a job by moving to the shopping mall or its environs.

In one embodiment, survival analysis is used to estimate the job probability based on supply, demand and surge forecasting in each route segment.

Examples of detailed techniques used in a specific embodiment will now be described. In this embodiment the cells are defined as geohashes. A geohash can be regarded as a convenient way of expressing a location (anywhere in the world) using an alphanumeric string. Smaller cells are defined using longer strings, with each added character defining a cell one-thirty second of the previous cell size.

The cell sizes of geohashes of different lengths are as follows; note that the cell width reduces moving away from the equator (to 0 at the poles):

| Geohash length | Cell width | | Cell height |
|---|---|---|---|
| 1 | ≤5,000 km | × | 5,000 km |
| 2 | ≤1,250 km | × | 625 km |
| 3 | ≤156 km | × | 156 km |
| 4 | ≤39.1 km | × | 19.5 km |
| 5 | ≤4.89 km | × | 4.89 km |
| 6 | ≤1.22 km | × | 0.61 km |
| 7 | ≤153 m | × | 153 m |
| 8 | ≤38.2 m | × | 19.1 m |
| 9 | ≤4.77 m | × | 4.77 m |

The size of the geohash (and in other embodiments, the size of zones or cells defined in other ways) is selected according to features like population density, number of service providers. In one embodiment a geohash length of 6 is used. In embodiments for different cities, there would be different cell sizes. And for the same city, as noted above different cell sizes in some embodiments are selected based on time and location.

Geohashes are rectangular but the invention is not so restricted and other shapes are envisaged in other embodiments.

In the presently described embodiment the cells are separated such that the circumstance within each cell is similar. Each sub-area can be a geohash or a combination of some geohashes or some particular area.

In an embodiment, server 102 uses multiple machine learning algorithms to predict supply, demand and surge in each cell.

The starting time of the route in each cell is also estimated by machine learning algorithms. For example, a service provider starts to move from place A to place B at 9:00 and goes through cells 1, 2, 3 until arrival at B. For example, if arrival is at cell 2 at 9:04 and cell 3 at 9:06 and destination B is reached at 9:10, then the supply, demand and surge forecasting of the server 102 is from 9:04 to 9:06 for area 2.

In an embodiment the server 102 uses multiple survival models to predict the job probability based on supply, demand and surge in each sub-area. For the example above, the job probability in area 2 is Pbar 1×P [9.04-9.06] where:

"Pbar 1" is the probability that service provider does not get a job in area 1; and P[9.04-9.06] is the probability of service provider getting a job from 9:04 to 9:06, (and where the probability of service provider getting a job from 9:04 to 9:06 is predicted from the survival model).

The supply figure is updated if the service provider complies to go to a recommended place B.

For the example above, the service provider will be in area 2 from 9:04 to 9:06. It should be borne in mind that at any time a user may become active in a cell along the recommended route, and the previously idle service provider may choose to accept the job requested by that user.

The present embodiment uses size-mutable, heterogeneous tabular data structures to do data analysis, for example, DataFrame in the Python package Pandas, Data Frame in R, Dataframe in Scala.

Figure 4:
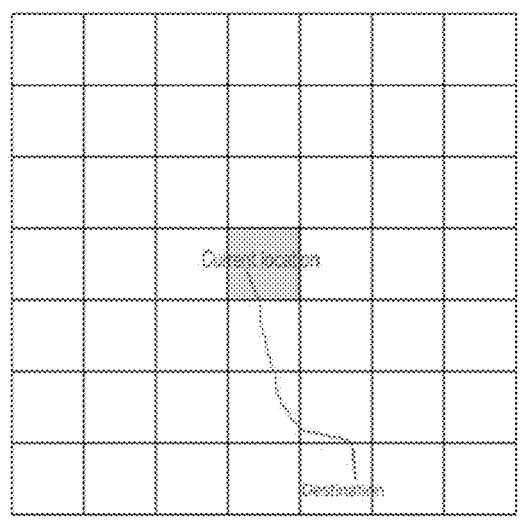
FIG. 4 shows a relocation route example.

FIG. 4 shows a relocation route example. Each grid represents a geohash, and different route segments within different geohashes are in different colours. A route is separated into segments such that each segment belongs to one and only one geohash (cell). There are 5 route segments in this route from service provider current location to destination, i.e., the POI in the target geohash.

To estimate the probability that a service provider will get a job for waiting time t if he stays in the same cell, this probability is denoted as F(t), which is also called the lifetime distribution function in survival analysis. Then the survival function is S(t)=1−F(t). In this embodiment the survival models are trained from historical data for example from the data warehouse 202 by using feature data stored therein, where "feature data" includes some or all of aggregated demand and supply of the geohash, driver rating, driver priority, whether it is central business district, whether it is weekday, whether it is peak hour, etc. The job probability, taking into account the features, is denoted by F(t; x), where x is the feature vector.

The expression $p_i$ is the conditional probability that the service provider gets a job within the i-th route segment (i-th cell along the route) when he waits for a duration of $(t_i-t_{i-1})$ given that no job arises before $t_{i-1}$. (That is the service provider has not already got a job before he enters the (i−1)th cell).

Let $x_i$ be the feature vector of the i-th route segment, then for the first cell, cell 1, $p_1$ is given by $p_1=F(t_1-t_0; x_1)$.

Then for the next geohash $p_2$ is given by $p_2=(1-p_1)F(t_2-t_1; x_2)$, $p_3=(1-p_1-p_2)F(t_3-t_2; x_3)$,

...,

In general, where a route has n segments, $p_n=(1-\Sigma_{i=1}^{n-1}p_i)F(t_n-t_{n-1}; x_n)$.

The probability that the service provider will get a job during a time window T during which he is predicted to be moving along the route from start to finish is given by $$\sum_{i=1}^{n} p_i.$$

T is a time duration chosen in some embodiments as the maximum time a service provider is likely to travel for in search of a job.

Let $s_i(t)$ be the surge of i-th route segment (i-th cell along the route) at time t, $d_i$, $t_i$ be the distance and time from current location to the last point of the i-th route segment, respectively, f be the average base fare per job, c be the average fuel cost per km, and v be the average revenue per second. Specially, set $d_0=0$, $t_0=0$, $t_n=T$ T is a given maximal cut duration, for instance the longest time a service provider is likely to travel for in search of a job. So, for example in a particular application, T=10 minutes. Any particular cell is deemed a candidate neighbour cell that is neighbour to the location of the idle service provider, if and only if the service provider can arrive within T=10 mins and the route distance is less than or equal to a given threshold. Or to put it another way: "T is a given stopping time larger than any arrival time of any candidate neighbour cell". If the service provider cannot arrive at a cell A within T=10 mins, cell A will NOT be considered at all. As will be understood, 10 minutes is only an example and other time durations are possible.

The expected revenue E of one route to a destination geohash is given by $$E = \sum_{i=1}^{n} r_i p_i,$$

where $r_i$ is the estimated revenue within the i-th route segment, $r_i = f \times s_i(t_i) - c \times (d_i - d_{i-1}) - v \times (t_i - t_{i-1})$ FIG. 5 shows an example of computing job probability and expected revenue of all the first layer neighbour geohashes of a geohash. In this example, only one route is found from current location to each destination. The table is sorted by expected revenue in descending order.

Figure 6:
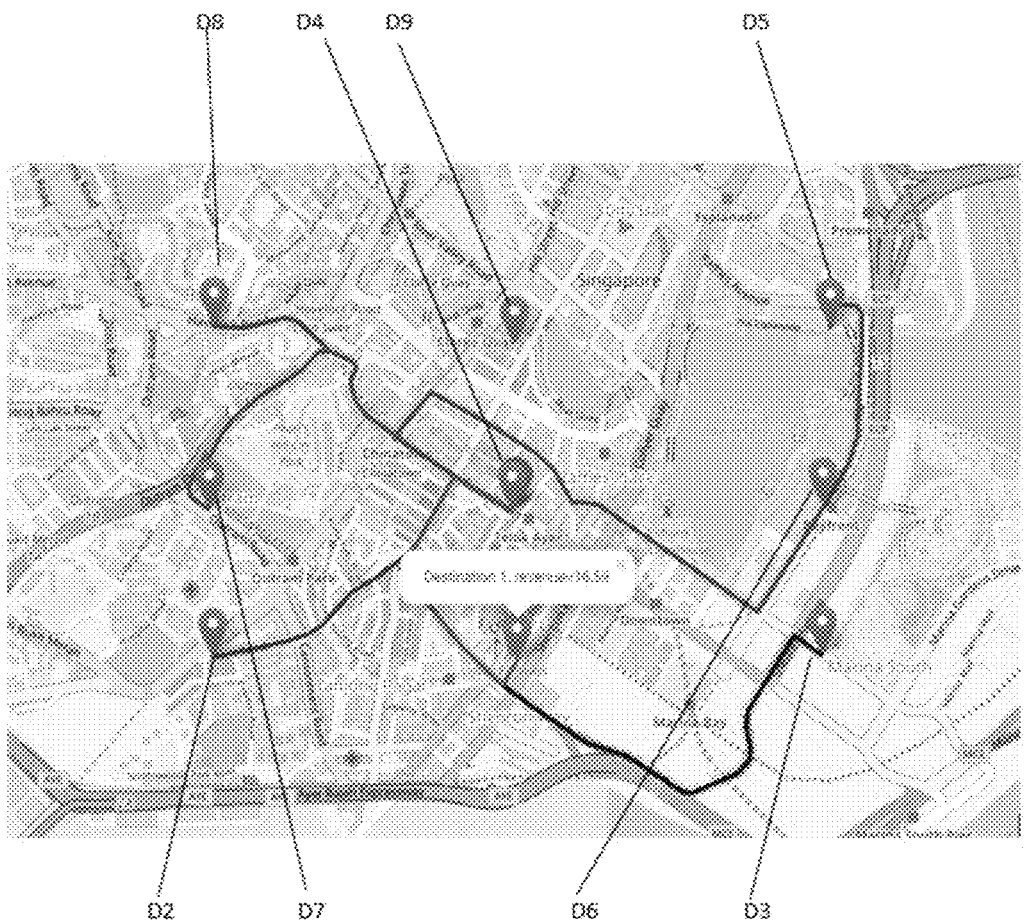
FIG. 6 shows a map of the 1st layer neighbour geohashes of the first geohash.

In the map of FIG. 6, the centre of each geohash is set as the respective destination POI; this map corresponds to the table of FIG. 5. Referring to both figures it will be seen that destination 3 has the highest probability of a job within 15 minutes, but destination 1 has the highest expected revenue. Destination 4, close to the start point, has a relatively low probability of a job, and a relatively low expected revenue.

When the demand and supply of one cell, e.g. geohash, is calculated, it may be necessary to aggregate the number in neighbour geohashes because the service providers may get jobs in a neighbouring cell.

To train the survival regression models, the available online waiting time is calculated by the system as the real waiting time for each service provider in a given time window. In addition, a service provider may or may not get a job during the waiting time. Censoring occurs when a service provider does not get a job during the waiting time t and the system only knows that the waiting time to get a job for the service provider is at least t. In fact, the survival regression models that are used can handle the censoring.

As described above the expected revenue is calculated in a discrete manner.

Alternatively, it is also possible to calculate the expected revenue of each route in a continuous version, $$E = \int_0^T r(t) F'(t) dt,$$

where r(t) is the estimated revenue at time t and F(t) is the probability that a service provider will get a job for waiting time t.

Figure 8:
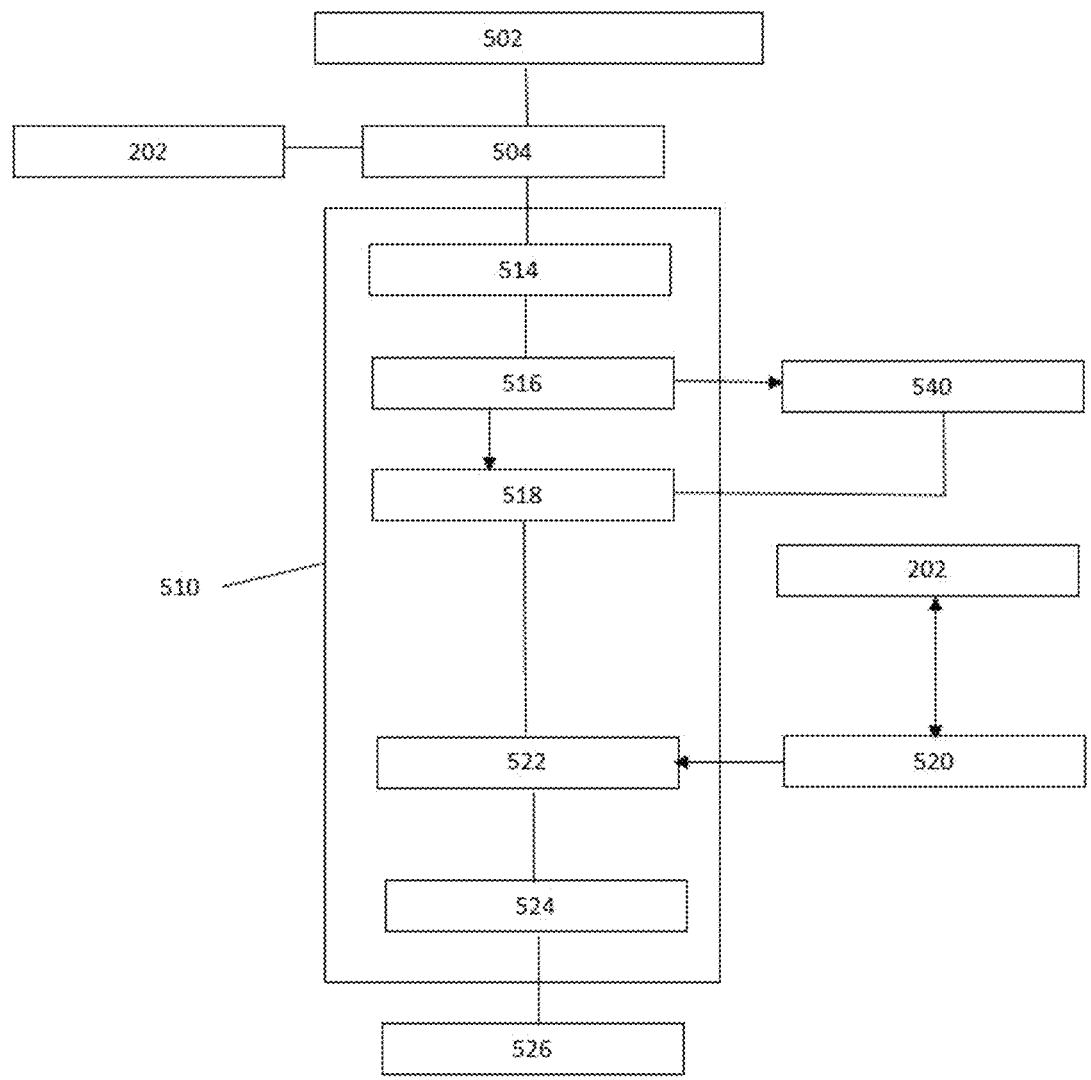
FIG. 8 shows a partial flow chart of a process for managing service providers.

Referring now to FIG. 8, a schematic view of a part of a flowchart of an embodiment of the process run in server 102 is shown.

Block 502 represents an input data record of the type that, in use, is pushed by service provider communications devices 104 to the server apparatus 102. The input data record 502 contains fields holding information indicative of a service provider communication device 104 originating the data record, and fields for such items as current location, whether or not idle, predicted time to end of present job.

The input data record 502 is passed to a decision process 504 of the server that tests for whether the service provider data field is indicative that the provider has become idle. If the provider is found to be idle, then the decision process 504 passes the packet to a route suggestion process 510, and passes other data from the server apparatus to the data warehouse 202. If the provider is not idle, then the decision process 504 passes the packet including current service provider location data to data warehouse 202 for storage therein.

If the decision process 504 passes the data record to the route suggestion process 510, the data record is passed thereby to a cell determining process 514 which determines a set of data records indicative of plural candidate destination cells.

Candidate destination cells are, in this embodiment, a subset of all of the cells overseen by the system, for example cells that are deemed not too far from the location of the idle service provider. The "not too far" parameter is set by parameters input to or held by the cell determining process 514.

Data records containing fields indicative of each candidate destination cell and of the service provider communication device originating the data record 502 are passed to a location process 516, which determines a point of interest (POI) in each candidate destination cell, and provides a destination data record indicative of each destination.

The destination data record is then passed to a route finder application 540, which returns a route data record comprising details of routes to each POI. The destination route record is passed to a route decomposing process 518. Route decomposing process 518 provides a decomposed route data record comprising a cell data record containing the set of cells through which the respective route passes. The cell data record is passed to a route assembly process 522.

The location process 516 also passes the part of the data record containing information indicative of the service provider communication device originating the message to the route segmenting process 518. The route decomposing process 518 passes the information indicative of the service provider communication device originating the message to the route assembly process 522.

The route assembly process 522 receives a prediction data record comprising prediction of job probability per cell from a prediction process 520 which accesses the data warehouse 202 and uses historic and other data to enable it to predict features such as supply, demand, and likely charge amount for each cell.

The prediction data record is combined in the route assembly process 522 with segment information from route decomposing process 518 to provide scores for each route of predicted job probability and the expected revenue from jobs arising on this route.

In one embodiment, the prediction process happens substantially all the time. In another embodiment the prediction process is done only when necessary, e.g. a service provider becomes idle or a request is received to call for this support. In this case, the computation of predictions can be reduced since only the geohashes in the route, i.e. the candidate destination POIs, will be considered, rather than those on the routes to all the POIs.

These estimates, along with the information indicative of the service provider communication device originating the message, are then applied to comparison process 524 which ranks the routes so as to select the route with the highest predictions of job or highest predicted revenue and fed to output process 526. The output process causes data on the selected route to be output to the service provider communication device originating the message, using the information provided from the comparison process 524. In an embodiment this route data is provided only to the service provider communications device originating the idle message.

Where the service provider is a human driver this route data is in a form allowing the service provider communications device to draw the driver's attention to the suggested route. This may be on a visual display, or a spoken suggestion. The data may be output in a form for immediate display on a navigation device of the service provider's vehicle. When an autonomous vehicle is the service providing vehicle, the data sent by the output process is typically formatted so as to command the vehicle to move to the decided destination.

In one family of embodiments, the system considers a waiting time only at the destination as it is assumed that the service provider will directly go to the destination by normal driving speed. It may be difficult to tell a human driver to wait in an intermediate cell. In other embodiments, for example but not exclusively those for so-called "driverless vehicle", directions are given to stop in intermediate locations when this improves the chance of a job or of a lucrative job.

For human service providers, the message sent includes the prediction of a waiting time, e.g. telling the provider he/she can expect a job if you wait around 5 minutes at a particular destination. However, there is no guarantee of a job within 5 mins.

The waiting time in the different destinations shown to the driver will vary. But when an optimal route is calculated, there needs to be a cut-off time T so as to be fair for all the routes.

It will be appreciated that the invention has been described by way of example only. Various modifications may be made to the techniques described herein without departing from the spirit and scope of the appended claims. The disclosed techniques comprise techniques which may be provided in a stand-alone manner, or in combination with one another. Therefore, features described with respect to one technique may also be presented in combination with another technique.

The invention claimed is:

1. Server apparatus for processing route information comprising a processor and a memory, the server apparatus being configured, under control of the processor, to execute instructions stored in the memory to:
   a. receive a pushed data record from a service provider communication device, the pushed data record including a current location of the service provider communication device;
   b. determine, via execution of a decision process, a service provider is idle based on data included in the pushed data record;
   c. determine one or more candidate destinations in response to the determination the service provider is idle;
   d. generate a route data record comprising details of plural routes, each said route being between a start location and a destination of the one or more candidate destinations, whereby each destination has at least one route to that respective destination from said start location;
   e. decompose the route data record to determine a segment data record indicative of route segments making up each route of the plural routes, each route segment lying in a respective zone, wherein the zone is a geohash having a size that changes based on all of: a number of service providers, a day of week, a time on the day of the week, and a location;
   f. combine the segment data record with a prediction data record, the prediction data record comprising a respective predicted value for each route segment making up the route data record, the respective predicted value based on a prediction by a trained neural network of a duration of time spent traveling along each route segment, the prediction based on a time of day, a day of week, historical road traveling speed, real-time traffic condition and weather, so as to score the route segments making up each said route of the plural routes to each destination based upon the respective predicted value in each route segment making up that route, wherein the predicted value is indicative of an estimated receivable value and a likelihood of any receivable value for each route segment and the predicted value is determined in response to the idle indication and only for the geohashes in the route for the candidate destinations, and the prediction data record is generated via execution of a machine learning process;
   g. transmit data indicative of the route with the highest score to the service provider communication device sending the pushed data record; and
   h. update a given geohash size in real-time in a case the service provider communication device moves to a route segment within the geohash in response to the transmitted data indicative of the route with the highest score, the movement identified based on the pushed current location of the service provider communication device.

2. Server apparatus according to claim 1, wherein the prediction data record comprises a prediction of a likelihood of a job in the respective zone.

3. Server apparatus according to claim 1, wherein the prediction data record comprises a prediction of a likely revenue in the respective zone.

4. Server apparatus according to claim 1, further being configured to initiate said step of generating a route data record in a case the service provider is idle.

5. Server apparatus according to claim 1, further comprising executable instructions to:
   output data indicative of at least one scored route for display at a service provider device.

6. A method performed in a server apparatus for processing route information for a service provider within a geographical area made up of a plurality of zones, each zone having a respective destination; the method comprising, under control of a processor of the server apparatus:
   a. receiving a pushed data record from a service provider communication device, the pushed data record including a current location of the service provider communication device;
   b. determining, via execution of a decision process, a service provider is idle based on data included in the pushed data record;
   c. determining one or more candidate destinations in response to the determination the service provider is idle;
   d. establishing a route data record comprising details of plural routes, each said route being between a start location and a destination of the one or more candidate destinations, whereby each destination has at least one route to that respective destination from said start location;
   e. decomposing the route data record to determine a segment data record indicative of route segments making up each route of the plural routes, each route segment lying in a respective zone, wherein the zone is a geohash having a size that changes based on all of: a number of service providers, a day of week, a time on the day of the week and a location;
   f. combining the segment data record with a prediction data record, the prediction data record comprising a respective predicted value for each route segment making up the route data record, the respective predicted value based on a prediction by a trained neural network of a duration of time spent traveling along each route segment, the prediction based on a time of day, a day of week, historical road traveling speed, real-time traffic condition and weather, and scoring the route segments making up each said route of the plural routes to each destination based upon the respective predicted value in each route segment making up that route, wherein the predicted value is indicative of an estimated receivable value and a likelihood of any receivable value for each route segment and the predicted value is determined in response to the idle indication and only for the geohashes in the route for the candidate destinations, and the prediction data record is generated via execution of a machine learning process;
   determining from the score routes the route with a highest score;
   transmitting data indicative of the route with a highest score to the service provider communication device sending the pushed data record for display by the service provider communication device; and
   updating a given geohash size in real-time in a case the service provider communication device moves to a route segment within the geohash in response to the transmitted data indicative of the route with the highest score, the movement identified based on the pushed current location of the service provider communication device.

7. The method of claim 6, wherein the prediction data record further comprises a prediction of a likelihood of a job in the respective zone.

8. The method of claim 6, wherein the value comprises a prediction of a likely revenue in the respective zone.

9. The method of claim 6, wherein each zone making up that route includes said start location.

10. The method of claim 6, wherein each zone making up that route includes each respective destination.

11. The method of claim 6, further comprising initiating said step of establishing the route data record comprising details of plural routes in response to receipt of the pushed data record from the service provider communication device.

12. The method of claim 11, further comprising sending data indicative of the route with the highest score to only said service provider communication device.

13. The method of claim 11, wherein a message includes data indicative of the zone in which the service provider communication device is located.

14. The method of claim 6, wherein the step of scoring each route comprises scoring each zone to determine a probability of a job in that zone, and summing the probabilities to achieve a route score.

15. The method of claim 6, wherein the step of scoring each route comprises scoring each zone to determine a prediction of likely revenue in that zone, and summing probabilities to achieve a route score.

16. A method of processing route information for a mobile service provider within a geographical area made up of a plurality of zones, each zone having a respective destination; the method comprising:
  receiving a pushed data record from a service provider communication device, the pushed data record including a current location of the service provider communication device;
  determining, via execution of a decision process, a service provider is idle based on data included in the pushed data record;
  identifying one or more candidate destinations in response to the determination the service provider is idle;
  establishing plural routes, each said route being between a start location and a destination of the one or more candidate destinations, whereby each destination has at least one route to that respective destination from said start location;
  determining zones making up each route, wherein each zone is a geohash having a size that changes based on all of: a number of service providers, a day of week, a time on the day of the week, and a location;
  scoring each said route zone to each destination based upon a prediction of a revenue to be derived from a job in each zone making up that route, the scoring based on a predicted duration of time spent traveling along each route zone output from a trained neural network, wherein the predicted revenue is indicative of an estimated receivable value and a likelihood of any receivable value for each job and the predicted revenue is determined in response to the idle indication and only for the geohashes for the candidate destinations, and the predicted duration of time and the predicted revenue are generated via execution of a respective machine learning process;
  determining from the score routes the route with a highest score;
  transmitting data indicative of the route with a highest score to the service provider communication device sending the pushed data record for display by the service provider communication device; and
  updating a given geohash in real-time in a case the service provider communication device moves to a route segment within the geohash in response to the transmitted data indicative of the route with the highest score, the movement identified based on the pushed current location of the service provider communication device.

17. A method performed in a server apparatus for processing route information for a mobile service provider within a geographical area made up of a plurality of zones, each zone having a respective destination; the method comprising, under control of a processor of the server apparatus:
  a. receiving a pushed data record from a service provider communication device, the pushed data record including a current location of the service provider communication device;
  b. determining, via execution of a decision process, the mobile service provider is idle based on data included in the pushed data record;
  c. determining one or more candidate destinations in response to the determination the service provider is idle;
  d. establishing plural routes, each said route being between a start location and a destination of the one or more candidate destinations, whereby each destination has at least one route to that respective destination from said start location;
  e. determining zones making up each route, wherein each zone is a geohash having a size that changes based on all of: a number of service providers, a day of week, a time on the day of the week, and a location; and
  f. scoring each said route zone to each destination based upon a prediction of an expected revenue in each zone making up that route, the scoring based on a predicted duration of time spent traveling along each zone output from a trained neural network, wherein the predicted expected revenue is indicative of an estimated receivable value and a likelihood of any receivable value for each job and the predicted revenue is determined in response to the idle indication and only for the geohashes for the candidate destinations, and the predicted duration of time and the predicted revenue are generated via execution of a respective machine learning process;
  g. determining from the score routes the route with a highest score;
  h. transmitting data indicative of the route with a highest score to the service provider communication device sending the pushed data record for display by the service provider communication device; and
  i. updating a given geohash size in real-time in a case the service provider communication device moves to a route segment within the geohash in response to the transmitted data indicative of the route with the highest score, the movement identified based on the pushed current location of the service provider communication device.

18. The method of claim 6, further comprising determining candidate destinations for use in said step of establishing the route data record comprising details of plural routes and disregarding destinations that are not candidate destinations, said step of determining candidate destinations comprising predicting journey time from the start location and selecting as candidate destinations those having a predicted journey time less than a predetermined time.

19. The method of claim 6, further comprising a step of forming a prediction of a probability of a job by predicting, for all the zones, a number of users and a number of available service providers.

20. The method of claim 6, further comprising a step of forming a prediction of a likely revenue by predicting, for all the zones, a number of service requests and a number of available service providers.

21. The method of claim 11, further comprising:
finding all candidate zones, wherein a candidate zone is a zone having a distance from the start location which is less than a given threshold, and finding a point of interest (POI) in each candidate zone based on historical bookings and at most top k driving trajectories from the start location to this point of interest.

22. The server apparatus according to claim 1, further comprising executable instructions to:
select the route with a highest score;
format the selected route in a command format;
transmit the formatted selected route to an autonomous vehicle; and
move the autonomous vehicle to the destination via the selected route in response to the received formatted selected route.

* * * * *